United States Patent [19]

Flanagan

[11] Patent Number: 4,944,994
[45] Date of Patent: Jul. 31, 1990

[54] TOUGHENED HOT MELT ADHESIVE COMPOSITION FOR BOOK CASEMAKING

[75] Inventor: Thomas P. Flanagan, Green Brook, N.J.

[73] Assignee: National Starch and Investment Holding Corporation, Wilmington, Del.

[21] Appl. No.: 233,173

[22] Filed: Aug. 17, 1988

[51] Int. Cl.$^5$ ............................................. G32B 27/00
[52] U.S. Cl. .................................... 428/290; 428/343; 428/517; 412/3; 412/5; 412/901; 281/29
[58] Field of Search ................ 412/3, 5, 901; 281/29; 428/343, 517, 290

[56] References Cited

U.S. PATENT DOCUMENTS

| | | | |
|---|---|---|---|
| 3,239,478 | 3/1966 | Harlan | 260/27 |
| 3,573,240 | 3/1971 | Flanagan | 260/23 |
| 3,615,106 | 10/1971 | Flanagan et al. | 281/21 |
| 3,837,994 | 9/1974 | Flanagan et al. | 161/100 |
| 3,964,769 | 6/1976 | Shatzkin | 281/21 R |
| 4,019,758 | 4/1977 | Heller et al. | 281/21 R |
| 4,091,487 | 5/1978 | Axelrod | 281/21 R |
| 4,136,699 | 1/1979 | Collins et al. | 128/290 R |
| 4,184,218 | 1/1980 | Hawkes | 11/1 AD |
| 4,187,572 | 2/1980 | Savich | 11/2 |
| 4,248,657 | 2/1981 | Henry | 156/443 |
| 4,345,349 | 8/1982 | Flanagen | 412/5 |
| 4,374,441 | 2/1983 | Carter et al. | 412/3 |
| 4,405,156 | 9/1983 | Carter | 281/29 |
| 4,411,954 | 10/1983 | Butch et al. | 428/343 |
| 4,420,282 | 12/1983 | Axelrod | 412/4 |
| 4,526,577 | 7/1985 | Schmidt et al. | 604/366 |
| 4,536,012 | 8/1985 | Hume | 281/21 R |
| 4,578,302 | 3/1986 | Schmidt et al. | 428/110 |
| 4,660,858 | 11/1987 | Flanagan | 412/8 X |
| 4,704,110 | 11/1987 | Raykovitz et al. | 604/366 |
| 4,712,808 | 12/1987 | Beh-Forrest | 156/908 X |
| 4,722,650 | 2/1988 | Allen et al. | 412/3 |

OTHER PUBLICATIONS

Blair, W. E. et al., "Good Tack and Open Time Help Animal Glue Hold Market Share", Adhesives Age, Jun. 1987.
Klinefelter, L. M., "Bookbinding Made Easy", The Bruce Publishing Company, Milwaukee, pp. 39–41.
Leitner, N. B., "A New Look at Animal Glue for Casemaking", H. B. Fuller Company.
Mielke, G. P., "Book Cover Warping", 8 pages.

Primary Examiner—Edith Buffalow
Attorney, Agent, or Firm—Ellen T. Dec; Edwin M. Szala

[57] ABSTRACT

A case or cover for a hard bound book is formed by bonding the formed by bonding the cover boards to the book cover stock using a hot melt pressure sensitive adhesive composition comprising:

(a) 10 to 40% by weight of a substantially radial styrene-butadiene block copolymer, the copolymer having a styrene content greater than about 35% by weight, a modulus at 300% elongation of at least 4.5 MPa and a solution viscosity less than about 1000 cps;

(b) 20 to 65% by weight of a compatible tackifying resin;

(c) 0.1 to 4% by weight stabilizer; and (d) the remainder (to 100%) comprising a plasticizing oil.

7 Claims, No Drawings

TOUGHENED HOT MELT ADHESIVE COMPOSITION FOR BOOK CASEMAKING

The present invention is directed to a process for the production of a case or cover for a hard bound book utilizing a specific class of toughened hot melt pressure sensitive adhesives.

Casemaking is a series of carefully synchronized procedures for making the cover of a hard bound book. In general, the material that will form the outer covering of the book, in precut or continuous web form, is coated with adhesive, passed along a conveyer under boards which have been precut to the exact size of the finished book cover, the boards are dropped in place and a center strip is laid down between the boards. If the cloth was not precut, it is then cut and, in either case, a portion of the cloth extends about ⅝th inch around the perimeter of the cover boards. This extension is then folded over the boards in a two step "turning-in" process with the sides folded first and the end folded to lap over the sides.

The adhesive used in order to construct the book cover or book case must possess certain critical properties. Because the operation is a multi-step one, the adhesive chosen must have a relatively long period of agressive tack so as to retain sufficient tack to instantly hold down the folded extensions without allowing them to spring back during the turning-in step. In addition to its agressive tack, the adhesive selected must have good machining properties, and it should be able to adhere a wide variety of case stock materials. Furthermore, once the case is formed, the adhesive must not penetrate the stock which would ruin the cover nor may it be affected by moisture, which could cause warping of the cover.

Heretofore animal glues have been the principal adhesives used for casemaking. These adhesives are, however, sensitive to moisture and are restricted in their use to a limited range of cover stocks. While some attempts have been made to use ethylene vinyl acetate hot melt adhesives that have been specially formulated to extend their open time, these adhesives have not met with success on a commercial scale.

It is therefore an object of the present invention to provide an adhesive suitable for use in case making operations, the adhesive being characterized by a long period of agressive tack, good machining properties and heat and moisture resistance.

It is a further object of the invention to provide such an adhesive which may be used on a wide variety of difficult to bond cover stocks.

These and other objects will be apparent from the description that follows.

SUMMARY OF INVENTION

We have now found that toughened pressure sensitive hot melt compositions prepared adhesives which comprise a substantially radial styrene-butadiene block copolymer, the copolymer having a styrene content greater than about 35% by weight, a modulus at 300% elongation of at least 4.5 MPa and a solution viscosity less than about 1000 cps are particularly useful in the casemaking operations.

Thus, the present invention is directed to a case or cover for a hand bound book formed by bonding the cover boards to the book cover stock using a hot melt pressure sensitive adhesive composition comprising:

(a) 10 to 40% by weight of a substantially radial styrene-butadiene block copolymer, the copolymer having a styrene content greater than about 35% by weight, a modulus at 300% elongation of at least 4.5 MPa and a solution viscosity less than about 1000 cps;

(b) 20 to 65% by weight of a compatible tackifying resin;

(c) 0.1 to 4% by a weight stabilizer; and (d) the remainder (to 100%) comprising a plasticizing oil.

The block copolymers useful herein are comprised of styrene and butadiene blocks arranged in a substantially radial configuration and contain at least 35%, and generally up to about 50%, by weight of the styrene moiety. Of greater significance however, the copolymers selected should exhibit a modulus at 300% elongation of at least about 4.5 MPa and a solution viscosity less than about 1000 cps (25% in toluene at 23° C. using a Brookfield viscometer). These copolymers may be prepared using methods taught, for example, in U.S. Pat. Nos. 3,239,478; 3,427,269; 3,700,633; 3,753,936 and 3,932,327. Alternatively they are available from Shell Chemical Co. under the trademark Kraton DX1122 (37% styrene, modulus of 4.8 MPa, viscosity 670 cps) and from Eni Chem Americas (Agip USA Inc.) as Europrene SOL T 162LW/1 (40% styrene, modulus of 5.0 MPa, viscosity 750 cps) or SO1 T 162 LW/2 (40% styrene, modulus of 4.6 MPa, viscosity (640 cps). While the optimum amounts of the copolymer used in the adhesive will vary depending on the end use application, the copolymer will generally be present in the adhesive formulation at levels of about 10 to 40% by weight, preferably about 15 to 25% by weight.

The tackifying resins useful in the adhesive compositions can be hydrocarbon resins, hydrogenated hydrocarbon resins, synthetic polyterpenes, rosin esters, natural polyterpenes, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of FriedelCrafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins: also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations. The tackifier is used in amounts of 20 to 65% by weight.

The remainder (up to about 60% by weight) of the hot melt adhesive comprises at least one oil diluents. Suitable plasticizing or extending oils include not only the usual plasticizing oils but also olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000.

Among the applicable stabilizers or antioxidants included herein are high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris (3,5-di-tert-butyl4-hydroxybenzyl)benzene; pentaerythrityl tetrakis-3(3,5-di-tert-butyl-4hydroxyphenyl)propionate; n-octadecyl-3,5-di-tert-butyl-4-hydroxyphenol)propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4- bis(n-octyl-thio)-1,3,5-triazine; di-n-octadecyl 3,5-di-tert-butyl-4- hydroxy-benzylphosphonate; 2-(n-octylthio)ethyl 3,5-di-tert-butyl4-hydroxy-benzoate; and sorbitol hexa[3-(3,5-di-tert-butyl-4- hydroxyphenyl)-propionate]. The stabilizer is present in amounts of 0.1 to 4% by weight, preferably less than about 2%.

Optional additives may be incorporated into the hot melt compositions in order to modify certain properties thereof. Among these additives may be included colorants such as titanium dioxide; and fillers such as talc and clay, etc. as well as minor amounts (e.g. less than about 5%) of a petroleum derived wax.

These hot melt adhesive compositions may be formulated using techniques known in the art. An exemplary procedure involves placing approximately half of the total tackifying resin concentration in a jacketed mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the particular tackifying resins. When the resin has melted, stirring is initiated and the block polymer and stabilizer are added together with any optional additives whose presence may be desired, the addition of the latter components being extended over a prolonged period in order to avoid the formation of lumps. Mixing and heating are continued until a smooth, homogeneous mass is obtained whereupon the remainder of the tackifying resin and the oil are thoroughly and uniformly admixed therewith. The resultant hot melt adhesives are generally produced with an oil in bulk form and packaged in release coated tube or boxes.

In the following illustrative examples all parts are given by weight and all temperatures in degrees Celsius unless otherwise noted.

EXAMPLE I

The following example illustrates the preparation of adhesives of the invention in formulations suitable for use in the bookbinding industry as discussed above.

In preparing the following samples, a heavy duty mixer which had been heated to 150° C. and which was equipped with a stirring paddle was charged with half of the tackifying resin. After melting of the resins, stirring was then initiated whereupon the block copolymers and the antioxidants were added slowly. Heating and stirring were continued until a homogeneous mass was obtained whereupon the remainder of the tackifying resin and the oil were admixed therewith. The molten mixture was then poured into a siliconized paper tube and cooled to room temperature.

Adhesives were prepared from the materials and amounts shown in Table I using the general procedure described above. Viscosity measurements were determined using a Brookfield viscometer (Spindle 27) at 325° F. The adhesives were subjected to the following tests to determine the heat resistance of the adhesive under a constant load and static stress and elevated temperature.

The adhesive was heated to 320° F. and a lamination of kraft paper was made using heated rollers. The adhesive thickness was 50 mil and the bonds having an adhesive area of one square inch. The bonds were aged overnight at 72° F. and 50% RH. The peel mode samples were then hung in a 105° F. oven using 300 gram-/inch weights. The time at which the bond failed was noted as was the made of failure.

The tensile strength of the hot melt adhesive was determined on samples cast from the hot melts and molded in silicone rubber molds into the shape of dog bones. After cooling, the dog bone shaped specimens were removed from the mold and tested using an Instron Tensile Tester. The force required to start to stretch the specimen is recorded as the "tensile yield", the force required to break the specimen as "tensile break". This procedure also provides a measurement of percent elongation, which is the percentage stretch of the hot melt sample at the point of rupture in obtaining the ultimate tensile strength.

TABLE I

| Sample | Polymer | Amount | Resin | Amount | Oil | Tensile Strength (MPa) | | K/K (hrs) | Viscosity (cps) |
| --- | --- | --- | --- | --- | --- | --- | --- | --- | --- |
| | | | | | | Y | U | | |
| 1 | DX1122X | 23 | Permalyn 305[(1)] | 59 | 18 | 0.06 | 1.17 | 3½ | 2975 |

TABLE I-continued

| Sample | Polymer | Amount | Resin | Amount | Oil | Tensile Strength (MPa) Y | U | K/K (hrs) | Viscosity (cps) |
|---|---|---|---|---|---|---|---|---|---|
| 2 | Sol T162 LW/1 | 23 | Permalyn 305 | 59 | 18 | 0.09 | 1.27 | 6½ | 3365 |
| 3 | Stereon 840A[2] | 23 | Permalyn 305 | 59 | 18 | 0.04 | 0.59 | 3½ | 2915 |
| 4 | DX1122X | 23 | Permalyn 305 | 57 | 20 | 0.05 | 1.16 | 5½ | 2950 |
| 5 | Firestone SR 7360[3] | 23 | Permalyn 305 | 57 | 20 | 0.04 | 0.86 | 2½ | 2525 |
| 6 | DX1122X | 21 | ECR 149B[4] | 60 | 19 | 0.05 | 1.17 | 2 | 2400 |
| 7 | Sol T162 LW/2 | 21 | ECR 149B | 60 | 19 | 0.07 | 1.27 | 2¾ | 2420 |
| 8 | Stereon 840A | 21 | ECR 149B | 60 | 19 | 0.04 | 0.62 | 3½ | 2470 |
| 9 | DX1122X | 15 | ECR 149A[5] | 30 | 25 | | | | |
| | | | ECR 149B | 30 | | 0.03 | 0.82 | 1 | 760 |
| 10 | Stereon 840A | 21 | ECR 149A | 30 | 19 | | | | |
| | | | ECR 149B | 30 | | 0.05 | 0.72 | 5½ | 2630 |
| 11 | Stereon 840A | 15 | ECR 149A | 30 | 25 | | | | |
| | | | ECR 149B | 30 | | 0.02 | 0.38 | 1⅞ | 685 |
| 12 | DX1122X | 21 | ECR 149A | 30 | 19 | | | | |
| | | | ECR 149B | 30 | | 0.07 | 1.3 | 7¼ | 3010 |
| 13 | DX1122X | 15 | Kristalex[6] | 8 | 25 | | | | |
| | | | ECR 149B | 52 | | 0.04 | 1.14 | 8¾ | 570 |
| 14 | Sol T162 LW/2 | 15 | Kristalex | 8 | 25 | | | | |
| | | | ECR 149B | 52 | | 0.04 | 1.22 | 6¼ | 805 |
| 15 | Firestone SR 7360 | 15 | Kristalex | 8 | 25 | | | | |
| | | | ECR 149B | 52 | | 0.03 | 0.73 | 3¼ | 765 |
| 16 | Stereon 840A | 15 | Kristalex | 8 | 25 | | | | |
| | | | ECR 149B | 52 | | 0.03 | 0.59 | 2¼ | 690 |
| 17 | DX1122X | 15 | Kristalex | 8 | 25 | | | | |
| | | | ECR 149A | 52 | | 0.06 | 1.24 | 25 | 1025 |
| 18 | DX1122X | 21 | M 105[7] | 60 | 19 | .06 | 1.19 | 16 | 2310 |
| 19 | SOL T162X LW/2 | 21 | M 105 | 60 | 19 | .08 | 1.39 | 16 | 2320 |
| 20 | Stereon 840A | 21 | M 105 | 60 | 19 | .04 | 0.83 | 4½ | 2450 |
| 21 | Stereon 840A | 21 | Res D2105[8] | 60 | 19 | .05 | 0.91 | 20½ | 2470 |
| 22 | Stereon 840A | 22.5 | Res D2105 | 60 | 17.5 | .06 | 1.06 | 40 | 2950 |
| 23 | SOL T168 | 22.5 | Res D2105 | 60 | 17.5 | .06 | 1.32 | 82 | 3535 |
| 24 | SOL T168 | 18 | Res D2105 | 60 | 22 | .02 | 0.85 | 4½ | 1390 |
| 25 | DX1122X | 18 | Res D2105 | 60 | 22 | .04 | 1.14 | 32½ | 935 |
| 26 | DX1122X | 15 | Res D2105 | 60 | 22*[9] | .03 | 0.98 | 8 | 600 |

[1]fermalyn 305 is a pentaerythritol ester of rosin from Hercules
[2]Stereon 840A is a styrene butadiene multi-block copolymer containing 43% styrene, having a modulus of 2.4 MPa and a solution viscosity of 650 cps. from Firestone
[3]Firestone SR 7360 is a stryene-butadiene polymer containing 43% styrene, having a modulus at 300% elongation of 3.7 MPa and a solution viscosity of 990 cps.
[4]ECR 149B is an aliphatic/aromatic $C_5/C_9$ resin from Exxon (95° C.)
[5]ECR 149A is an aliphatic/aromatic $C_5/C_9$ resin form Exxon (softening pt. 105° C.)
[6]Kristalex 5140 is an alpha methyl styrene resin from Hercules (140° C.)
[7]M 105 is a styrenated terpene resin from Reichhold
[8]Res D2105 is a styrenated terpene resin from Hercules
[9]Also contained 3 parts ECR 143H, a liquid aliphatic tackifying resin available from Exxon The testing results of Samples 1–8 show significantly higher ultimate tensile strength of the adhesives of the present invention when contrasted with presently commercially utilized adhesive compositions containing similar amounts of raw materials.

Sample 9 shows that it is possible to use less polymer to obtain a lower viscosity adhesive without sacrifice of tensile strength. (Compare to Sample 11 prepared with 15 parts Stereon). Note however the product did suffer with respect to Kraft/Kraft adhesive and hence would not be readily useful for certain end use applications where stringent heat resistance values are required.

Samples 12, 13 and 14 show results similar to those of Sample 9, additionally overcoming the deficiency of Sample 9 with respect to heat resistance by use of a different tackifier system.

Sample 17 shows a further formulation according to the invention using a different tackifying system. Note, in particular, the high heat resistance value.

Samples 18 through 26 again show the improved heat resistance and ultimate tensile strength achieved using adhesive compositions of the invention as contrasted to conventionally employed Stereon containing adhesive systems with Samples 24, 25 and 26, also showing that lower levels of the Kraton D1122X may be used to obtain lower viscosity products without sacrifice to the tensile strength.

All of samples 1–22, on testing, gave entirely cohesive modes of failure in the Kraft to Kraft heat resistance test, i.e., adhesive residue was observed on both substrates after bond failure.

The resultant adhesives may be used in casemaking operations to bond the cover boards to the cover stock. The cover board or binders board are generally chip board that has been compressed to give a high bursting strength board, sometimes designated chestnut cover board. As noted previously, the hot melt adhesives used herein allow production of cases without limitation to the type of cover stock or cloth used. Thus, the book cover fabric chosen may include paper cloth, woven fabric, pryoxylin, vinyl or other resin impregnated or coated fabric. In addition a synthetic material comprising a spunbonded olefin of high density polyethylene fibers available from E. I. DuPont de Nemours and Co., Inc. under the tradename Tyvec may be used.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A case for a hard cover book formed by bonding the cover boards to the book cover stock using a hot melt pressure sensitive adhesive composition comprising:
   (a) 10 to 40% by weight of a substantially radial styrene-butadiene block copolymer, the copolymer having a styrene content greater than about 35% by weight, a modulus at 300% elongation of at least 4.5 MPa and a solution viscosity less than about 1000 cps;
   (b) 20 to 65% by weight of a compatible tackifying resin;
   (c) 0.1 to 4% by weight stabilizer; and
   (d) the remainder (to 100%) comprising a plasticizing oil.

2. The case of claim 1 wherein the tackifier in the hot melt adhesive composition is any compatible resin or mixture thereof selected from the group consisting of (1) natural and modified rosins1 (2) glycerol and pentaerythritol esters of natural and modified rosins; (3) copolymers and terpolymers of natural terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

3. The case of claim 1 wherein the cover board is chestnut cover board.

4. The case of claim 1 wherein the cover stock is selected from the group consisting of paper cloth, woven fabric, pyroxylin, vinyl impregnated on coated stock and spun bonded high density polyethylene.

5. In a process for the production of a book case wherein the cover boards are bonded to the cover stock, the improvement which comprises using a hot melt pressure sensitive adhesive comprising:
   (a) 10 to 40% by weight of a substantially radial styrene-butadiene block copolymer, the copolymer having a styrene content greater than about 35% by weight, a modulus at 300% elongation of at least 4.5 MPa and a solution viscosity less than about 1000 cps;
   (b) 20 to 65% by weight of a compatible tackifying resin;
   (c) 0.1 to 4% by weight stabilizer; and
   (d) the remainder (to 100%) comprising a plasticizing oil.

6. The process of claim 5 wherein the cover board is chestnut cover board.

7. The process of claim 5 wherein the cover stock is selected from the group consisting of paper cloth, woven fabric, pyroxylin, vinyl impregnated or coated stock and spun bonded high density polyethylene.

* * * * *